United States Patent
Ura

(10) Patent No.: US 7,138,795 B2
(45) Date of Patent: Nov. 21, 2006

(54) ROTATION ANGLE DETECTOR AND ITS TEMPERATURE CORRECTING METHOD

(75) Inventor: Noritake Ura, Aichi-ken (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 294 days.

(21) Appl. No.: 10/506,679

(22) PCT Filed: May 28, 2003

(86) PCT No.: PCT/JP03/06630

§ 371 (c)(1),
(2), (4) Date: Sep. 17, 2004

(87) PCT Pub. No.: WO03/100353

PCT Pub. Date: Dec. 4, 2003

(65) Prior Publication Data

US 2005/0127280 A1    Jun. 16, 2005

(30) Foreign Application Priority Data

May 29, 2002 (JP) ............................. 2002-155651

(51) Int. Cl.
*G01B 7/30* (2006.01)
*G01R 33/025* (2006.01)

(52) U.S. Cl. ........................ 324/207.25; 324/207.12; 324/207.17

(58) Field of Classification Search ............... 324/202, 324/207.11–207.18, 207.2–207.25; 318/661; 702/151
See application file for complete search history.

(56) References Cited

U.S. PATENT DOCUMENTS

| 3,851,330 | A | * | 11/1974 | Huber ........................ 341/115 |
| 5,239,490 | A | * | 8/1993 | Masaki et al. ................. 702/41 |
| 5,453,684 | A | * | 9/1995 | Nakayama ............. 324/207.12 |
| 5,637,998 | A | * | 6/1997 | Kushihara ............. 324/207.25 |
| 5,710,509 | A | * | 1/1998 | Goto et al. ............. 324/207.25 |
| 6,484,120 | B1 | * | 11/2002 | Goto et al. ................. 702/151 |
| 6,522,097 | B1 | * | 2/2003 | Fujimoto et al. ........... 318/605 |
| 6,571,194 | B1 | * | 5/2003 | Goto et al. ................. 702/151 |

FOREIGN PATENT DOCUMENTS

| EP | 0 772 025 A1 | 5/1997 |
| EP | 1 054 238 | 11/2000 |
| EP | 1 090 699 | 4/2001 |
| JP | 2000-283861 | 10/2000 |
| JP | 2003-315098 | 11/2003 |

* cited by examiner

*Primary Examiner*—Edward Lefkowitz
*Assistant Examiner*—Kenneth J. Whittington
(74) *Attorney, Agent, or Firm*—Oblon, Spivak, McClelland, Maier & Neustadt, P.C.

(57) ABSTRACT

A first sin phase voltage representing the rotational angle of a resolver is derived from the sum of a rotational angle voltage involving a temperature component and a bias voltage. The rotational angle voltage and the bias voltage are calculated by calculating the values of the maximum peak point ($\theta=90$ degrees) and the maximum bottom point ($\theta=270$ degrees) of the rotor and then by subtracting them or adding them, respectively. Subsequently, a transformer efficiency $K(T)$ and a phase difference $\alpha(T)$ which involve temperature components therein are calculated from the rotational angle voltage, while an impedance $R(T)$ of a common earth wire and another phase difference $\beta(T)$ which involve temperature components are calculated from the bias voltage. The rotational angle can be calculated by putting these parameters into equations for calculating the first sin phase voltage. As a consequence, it becomes possible to detect the rotational angle of the rotor accurately without suffering the influence of temperature.

3 Claims, 5 Drawing Sheets

ROTATION ANGLE DETECTOR AND ITS TEMPERATURE CORRECTING METHOD

TECHNICAL FIELD

The present invention relates to a rotational angle detection device and a temperature compensation method therefor, and in particular, it relates to a derivation method therefor.

BACKGROUND ART

For example, as a rotational angle detection device for detecting the rotational angle by means of a conventional resolver, there is a rotational angle detection device, which is described in Japanese Patent Application No. 2002-127173 (hereafter referred to as "prior art"). As shown in FIG. 5, prior art describes that in case that an exciting coil 122, a cos phase coil 128, and a sin phase coil 130 are grounded through a common earth wire 146, the voltage which is made as a result that an alternating current bias voltage which is caused by an impedance 144 of the earth wire 146 and an exciting current, is superimposed on an alternating-current rotational angle voltage whose amplitude fluctuates in dependence on a sin value of a rotor rotational angle θ is output to a terminal 136 of the sin phase coil 130. As a result, a problem arises in that the detection accuracy of a rotor 122 rotational angle, which is gained from a voltage output from the terminal 136 of the sin phase coil 130, is lowered. To solve this problem, the prior art discloses the following rotational angle detection device. First, a steering wheel is slowly rotated through one revolution, during which the sin phase voltages are sampled to be stored in a RAM. Then, from the stored data in the RAM, four points of the one-cycle sin phase voltages are selected for data around the maximum peak value (at a 90-degree steering wheel angle) and around the maximum bottom value (at a 270-degree steering wheel angle), and then, those data are added in order. By dividing each value of these added data by numeral 2, only the bias voltage can be derived. By subtracting this bias voltage from the sin phase voltage, a rotational angle voltage is calculated. And then, a rotational angle is derived from this rotational angle voltage.

However, in the prior art, sufficient consideration is not given regarding a temperature variation which varies every moment. For example, a problem remains unsolved in that the rotational angle cannot be detected accurately for the following reason. That is, a resistance value of the impedance 144 has a temperature drift due to a variation in the ambient temperature, and as a result, the output voltage from the terminal 136 of the sin phase coil 130 also has a temperature drift.

Accordingly, the present invention has been made aiming at the above unsolved problem in the prior art, and it is an object of the invention to provide a rotational angle detection device which is highly accurate not to involve the rotational angle error due to a temperature variation which varies every moment.

DISCLOSURE OF THE INVENTION

The first invention resides in a rotational angle detection device having: a rotating rotor; an exciting coil secured to the rotor and having one end thereof to which an alternating-current exciting current is applied and the other end thereof connected to an earth wire; and a stator coil stationarily provided around the rotor and having one end thereof for taking out an output voltage and the other end thereof connected to the earth wire, the stator coil being for outputting the voltage which is made as a result that an alternating-current bias voltage, caused by an impedance of the earth wire and the exciting current, is superimposed on an alternating-current rotational angle voltage the amplitude of which fluctuates in dependence on the rotational angle of the rotor; the rotational angle detection device comprising: memory means for storing data necessary to calculate values of temperature-dependent components in connection with the passing time from a reference time; rotational angle voltage detection means for calculating the alternating-current rotational angle voltage by subtraction means for subtracting the data stored in the memory means; bias detection means for calculating the alternating-current bias voltage by addition means for adding the data stored in the memory means; and means for calculating an amplitude value of the alternating-current rotational angle voltage, a phase difference of the alternating-current rotational angle voltage from the reference time, an amplitude value of the alternating-current bias voltage, and a phase difference of the alternating-current bias voltage from the reference time, based on values sampled by the rotational angle voltage detection means and the bias detection means at at least two different time points According to the first invention, when the rotor rotates relative to the stator coil, the output voltage which is made as a result that the alternating-current bias voltage, caused by the impedance of the earth wire and the exciting current, is superimposed on the alternating-current rotational angle voltage whose amplitude fluctuates in dependence on the rotational angle of the rotor, is generated at one end of the stator coil. The data memory means which stores the data necessary to calculate the values of the temperature-dependent components also stores data necessary to calculate the alternating-current rotational angle voltage and the alternating-current bias voltage in connection with the passing time from the reference time. The data memory means successively samples and stores the output voltages during the rotation of the rotor. The rotational angle voltage detection means subtracts the first output voltages and the second output voltages which are the same in the passing time from the reference time, of the data stored in the memory means by the subtraction means thereby to calculate the alternating-current rotational angle voltage. The bias detection means adds the first output voltages and the second output voltages which are the same in the passing time from the reference time, of the data stored in the memory means by the addition means thereby to calculate the alternating-current bias voltage. The amplitude value of the alternating-current rotational angle voltage calculated by the rotational angle voltage detection means, the phase difference of the alternating-current rotational angle voltage from the reference time, the amplitude value of the alternating-current bias voltage calculated by the bias detection means, and the phase difference of the alternating-current bias voltage from the reference time are calculated based on the values which are sampled at at least two different time points. By using the amplitude value of the alternating-current rotational angle voltage, the phase difference of the alternating-current rotational angle voltage from the reference time, the amplitude value of the alternating-current bias voltage, and the phase difference of the alternating-current bias voltage from the reference time, the rotational angle can be detected accurately without suffering the influence of the temperature varying every moment.

The second invention is characterized by providing the rotational angle detection device according to the foregoing first invention with means for successively sampling and storing the output voltages during the rotation of the rotor; means for specifying first output voltages for at least one-cycle including the maximum peak value, from the output voltages being stored; means for specifying second output voltages for at least one-cycle including the maximum bottom value, from the output voltages being stored; and means for successively subtracting and adding the first output voltages and the second output voltages which are the same in the passing time from the reference time, of the specified first output voltages and the specified second output voltages.

According to the second invention, at the electrical angle where the output voltage which is made as a result that the bias voltage is superimposed on the rotational angle voltage shows a peak value, the rotational angle voltage also shows a peak value, and at the electrical angle where the output voltage shows a bottom value, the rotational angle voltage also shows a bottom value. Therefore, the first output voltages for at least one cycle including the maximum peak value are specified from the memorized output voltages, and the second output voltages for at least one cycle including the maximum bottom value are specified from the memorized output voltages. Then, the alternating-current rotational angle voltage and the alternating-current bias voltage are calculated by successively subtracting and adding the first output voltages and the second output voltages which are the same in the passing time from the reference time.

Further, the third invention resides in a temperature compensation method for the temperature which affects an output voltage of a rotational angle detection device for outputting a voltage made as a result that an alternating-current bias voltage, caused by an impedance of an earth wire and an exciting current, is superimposed on an alternating-current rotational angle voltage whose amplitude fluctuates in dependence on the rotational angle of a rotor, the temperature compensation method comprising: a first step of successively sampling the output voltages with the rotor being rotated; a second step of specifying first output voltages for at least one cycle in rotational angle including the maximum peak value, from the sampled output voltages; a third step of specifying second output voltages for at least one cycle in rotational angle including the maximum bottom value, from the sampled output voltages; a fourth step of calculating the alternating-current rotational angle voltage by successively subtracting the first and second output voltages which are same in the passing time from a reference time, of on the specified first output voltages and the specified second output voltages; a fifth step of calculating the alternating-current bias voltage by successively adding the first output voltages and the second output voltages, which are the same in the passing time from the reference time, of the specified first output voltages and the specified second output voltages; and a sixth step of calculating an amplitude value of the alternating-current rotational angle voltage, a phase difference of the alternating-current rotational angle voltage from the reference time, an amplitude value of the alternating-current bias voltage, and a phase difference of the alternating-current bias voltage from the reference time, based on values which have been sampled at at least two different time points at the fourth step and the fifth step.

According to the temperature compensation method relating to the third invention, by successively sampling the output voltages with the rotor being rotated, the first output voltages for at least one cycle including the maximum peak value can be specified from the sampled output voltages. The second output voltages for at least one cycle including the maximum bottom value can also be specified from the sampled output voltages. The alternating-current rotational angle voltage can be calculated by successively subtracting the first output voltages and the second output voltages which are the same in the passing time from the reference time, of the specified first output voltages and the specified second output voltages. The alternating-current bias voltage can also be calculated by successively adding the first output voltages and the second output voltages which are the same in the passing time from the reference time, of the specified first output voltages and the specified second output voltages. The amplitude value of the alternating-current rotational angle voltage, the phase difference of the alternating-current rotational angle voltage from the reference time, the amplitude value of the alternating-current bias voltage, and the phase difference of the alternating-current bias voltage from the reference time can be calculated based on the values which are sampled at at least two different time points from the alternating-current rotational angle voltage and the alternating-current bias voltage. The rotational angle detection device which is highly accurate not to be affected by the temperature fluctuating every moment can be obtained by utilizing the calculated amplitude value and phase difference of the alternating-current rotational angle voltage and the calculated amplitude value and phase difference of the alternating-current bias voltage.

BEST MODE FOR CARRYING OUT THE INVENTION

Figure 1:
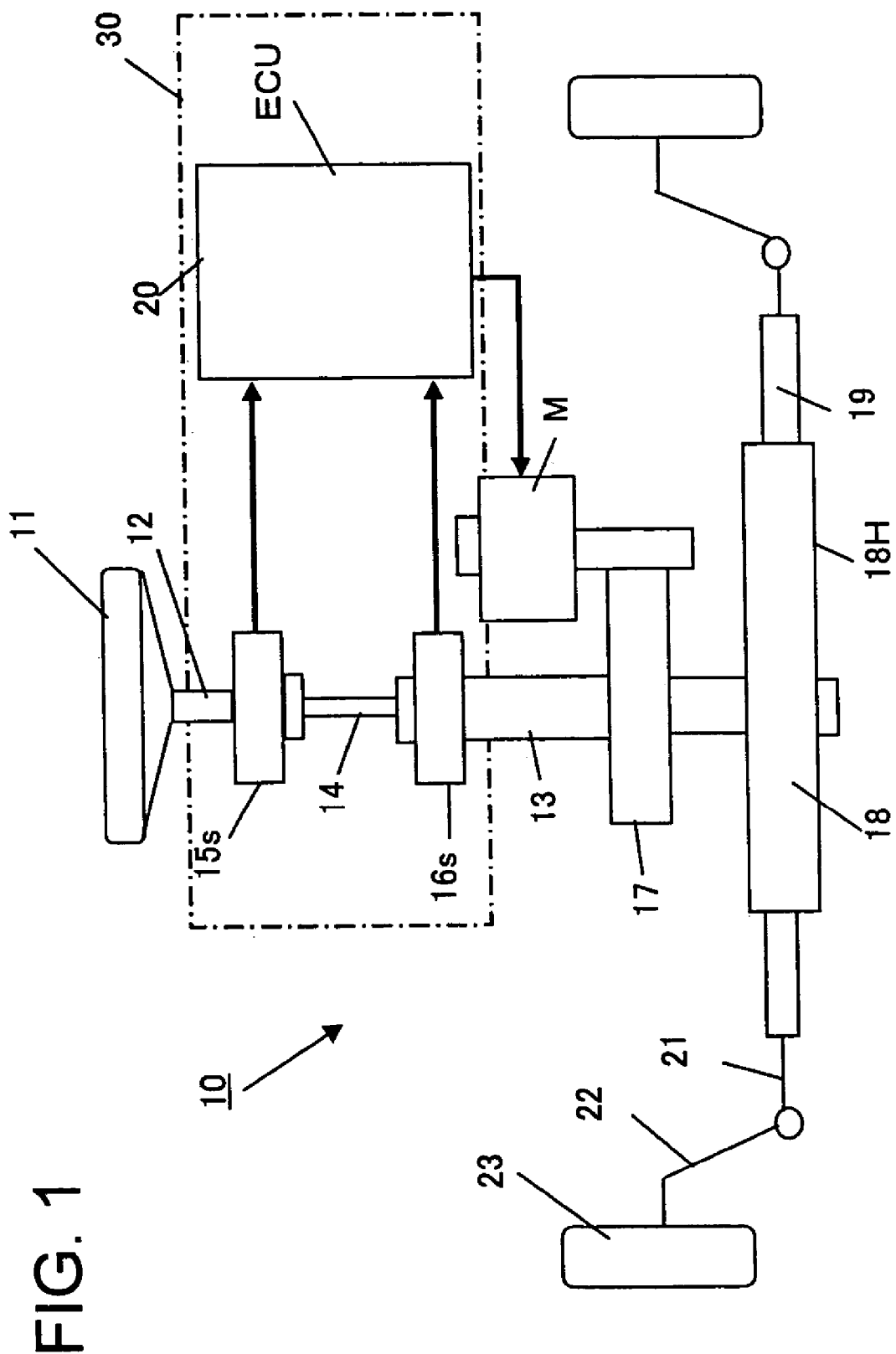
FIG. 1 is a structure diagram illustrating an electric power steering system to which a torque detection device in an embodiment of the present invention is applied.

The structure of an electric power steering system 10, to which the present invention is applied, is shown in FIG. 1. This system 10 comprises a first rotational angle detection device mainly composed of an ECU 20 and a first resolver 15s and a second rotational angle detection device composed of the ECU 20 and a second resolver 16s. Further, the ECU 20, the first resolver 15s and the second resolver 16s constitute a torque detection device for converting the driver's handle steering into a torque value thereby to detect the same. In this electric power steering system 10, a handle 11 is connected with one end of a handle shaft 12, and one end of a torsion bar 14 is connected with the other end of the handle shaft 12. The other end of the torsion bar 14 is connected with a pinion shaft 13 via an output shaft. A pinion of the pinion shaft 13 is meshing with a rack 19. The rack 19 and a rack housing 18H compose a rack mechanism 18. The rack mechanism 18 is constituted to reciprocate the rack 19 axially inside of the rack housing 18H. Both ends of the rack mechanism 18 have respective one ends of tie rods 21 attached thereto. Other ends of the tie rods 21 are connected with respective one ends of knuckle arms 22. Other ends of the knuckle arms 22 are connected with wheels 23.

The first resolver 15s is provided around a lower end of the aforementioned handle shaft 12. The first resolver 15s functions as a first rotational angle detection portion for detecting a first rotational angle θ1 regarding the handle shaft 12. The second resolver 16s is provided around a lower end of the torsion bar 14. The second resolver 16s functions as a second rotational angle detection portion for detecting a second rotation angle θ2 regarding the pinion 13. The first resolver 15s and the second resolver 16s are electrically connected with the ECU 20. A torque detection device 30 is composed of the ECU 20, the first resolver 15s and the second resolver 16s. The ECU 20 composing the torque detection device calculates a steering torque value T=$K_T$ (θ1−θ2) which the driver generates by steering the handle 11, based on the first rotational angle θ1 detected by the first resolver 15s and the second rotational angle θ2 detected by the second resolver 16s. Symbol $K_T$ is a spring constant of the torsion bar 14. The ECU 20 is connected with a motor M, converts the calculated torque value T into a command current by reference to a predetermined torque/current value conversion map, and executes PWM (Pulse Width Modulation) control through a current control section. More concrete constructions of the torque detection devices 30, 15s, 16s will be described later. The motor M transmits the generated assist torque to the rack mechanism 18 via a reduction gear 17.

The operation of this electric power steering system 10 will be described. First, when the driver steers the handle 11, the handle shaft 12 is rotated. When the handle shaft 12 is rotated, the pinion shaft 13 is also rotated via the torsion bar 14. When the pinion shaft 13 is rotated, the rack 19 meshing with the pinion is moved axially, and the traveling direction of the wheels 23 is varied via the tie rods 21 and the knuckle arms 22. The torque generated from the steering action by the driver of the handle 11 is detected by the torque detection devices 30, 15s, 16s. The ECU 20 composing the torque detection device controls the motor M in dependence on the detected torque.

When the steering torque detected by the torque detection device 30 is small, the ECU 20 controls the motor M to generate a small assist torque. When the steering torque detected by the torque detection device 30 is large, the ECU 20 controls the motor M to generate a large assist torque. The assist torque generated by the motor M is transmitted to the rack mechanism 18 to assist the movement of the rack 19. Therefore, the driver can steer the handle 11 with a small power.

Figure 2:
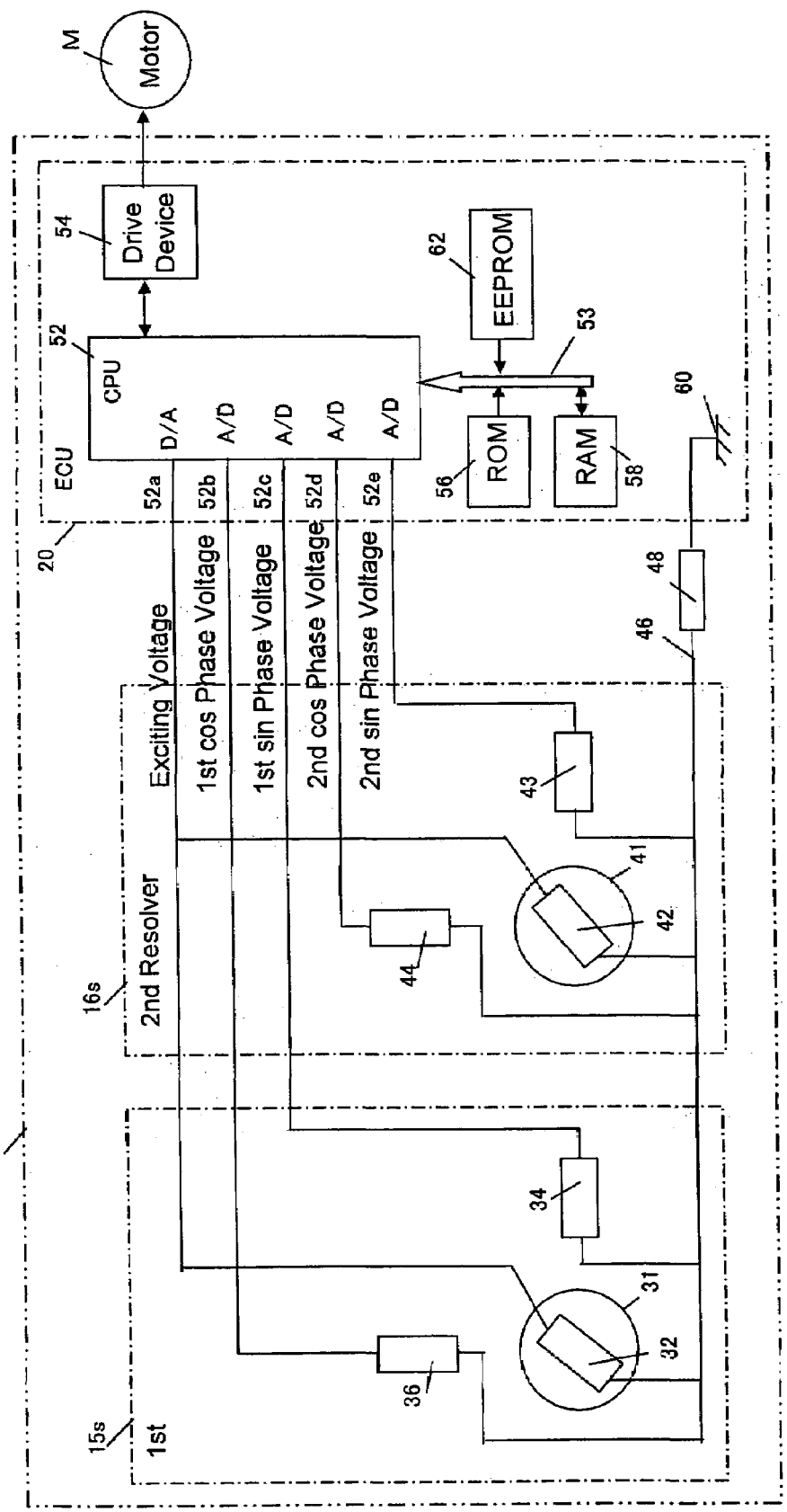
FIG. 2 is a block diagram illustrating a torque detection device.

The block diagram of the torque detection device 30 is shown in FIG. 2. As described above, the torque detection device 30 includes the first rotational angle detection device composed with the ECU 20 and the first resolver 15s and the second rotational angle detection device composed with the ECU 20 and the second resolver 16s. The ECU 20 is composed of a CPU 52 and a ROM 56, a RAM 58 and an EEPROM (Electrically Erasable Programmable ROM) 59 which are connected to the CPU 52 via an internal bus 53. The CPU 52 has ports such as input ports 52b–52e, an output port 52a, etc. The input ports 52b–52e are connected with an analog to digital converter inside of the CPU 52, so that any analog signal is converted into a digital signal to be processed in the CPU 52. Besides, the output port 52a is connected with a digital to analog converter inside of the CPU 52, so that a digital signal is converted into an analog signal to be output to the first resolver 15s, the second resolver 16s, and the motor M. The ROM 56 has stored therein a program for executing the derivation processing of temperature compensation described later; another program for torque calculation and the like.

The first resolver 15s is provided with a first rotor 31, a first exciting coil 32, a first sin phase coil (stator coil) 34, a first cos phase coil (stator coil) 36, etc. The second resolver 16s is provided with a second rotor 41, a second exciting coil 42, a second sin phase coil (stator coil) 43, a second cos phase coil (stator coil) 44, etc. The first rotor 31 has the first exciting coil 32. When the first rotor 31 is rotated, the first exciting coil 32 is also rotated. In the preferred embodiment, although not illustrated concretely, for higher detection accuracy of rotational angle, the rotor coils are arranged to gain the electrical angle which is four times as large as the mechanical rotational angle of the first rotor 31. To make the electrical angle four times, there are provided four pairs of the south poles and the north poles, and the resolution of the rotational angle is increased to four times since the increase in speed which may otherwise be performed mechanically by the use of a number of gears or the like in general is performed electrically. The term "rotational angle" referred to hereafter means the electrical angle unless specified to the contrary.

The first exciting coil 32 of the first resolver 15s is wound in a slot of the first rotor 31. One end of this first exciting coil 32 has an alternating-current exciting voltage (equation (1) described later) applied thereto from the output port 52a of the CPU 52, and the other end thereof is connected with a common earth wire 46. Further, the second exciting coil 42 of the second resolver 16s is wound in a slot of the second rotor 41. This second exciting coil 42 also has at its one end an alternating-current exciting voltage (equation (1) described later) applied thereto from the output port 52a of the CPU 52, and is connected with the common earth wire 46 at the other end thereof. Therefore, the total current of the first exciting current passing through the first exciting coil 32 and the second exciting current passing through the second exciting coil 42 passes through the common earth wire 46. Hereafter, the total current of the first exciting current and the second exciting current will be referred to simply as "exciting current". The exciting coils 32 and 42 compose a transformer in combination with coils (not shown) which are built in the rotors 31 and 41. The voltage generated in the coils which are not shown are applied as exciting voltages respectively to the exciting coils 32 and 42. Although in the preferred embodiment, a contactless-type transformer is described as means for applying exciting voltages to the exciting coils 32 and 42 of the first rotor 31 and the second rotor 41 from the outside, a contact-type brush may be used in substitution therefor.

The exciting voltage is expressed by the following equation (1).

$$Ve = E \sin \omega t \tag{1}$$

The exciting current is expressed by the following equation (2).

$$Ie = I \sin(\omega t + \beta) \tag{2}$$

Symbols in these equations represent the followings: E is the amplitude of the exciting voltage (volt), ω is the angle speed of the exciting voltage (rad/s), I is the amplitude of the exciting current (amp), and β is the phase difference of the exciting current from the exciting voltage. The angle speed ω of the exciting voltage has a relationship of ω=2π/P, and P in this case is the cycle (s). In the preferred example, P is set to 200 μs.

The first cos phase coil 36 of the first resolver 15s is wound in a slot of a stator which is fixed around the first rotor 31 in coaxial alignment with the same. This first cos phase coil 36 is connected to the input port 52b of the CPU 52 so that the first cos phase voltage generated at one end thereof is input to the input port 52b of the CPU 52, and is further connected to the common earth wire 46 at the other end thereof. The first cos phase voltage (expressed by equation (5) referred to later) is the voltage which is made as a result that an alternating-current bias voltage (expressed by equation (4) referred to later) which depends on an impedance 48 of the common earth wire 46 and the exciting current is superimposed on an alternating-current rotational angle voltage (expressed by equation (3) referred to later) whose amplitude fluctuates in dependence on a cos value at the rotational angle θ1 of the first rotor 31.

The rotational angle voltage of the first cos phase voltage is expressed by the following equation (3).

$$V\cos 1 = EK(T)\sin(\omega t + \alpha(T))\cos(\theta 1) \quad (3)$$

The bias voltage is expressed by the following equation (4).

$$V\text{bias} = R(T)I\sin(\omega t + \beta(T)) \quad (4)$$

The first cos phase voltage is expressed by the following equation (5) which is obtained by adding the equation (3) and the equation (4).

$$V\cos 1T = EK(T)\sin(\omega t + \alpha(T))\cos(\theta 1) + R(T)I\sin(\omega t + \beta(T)) \quad (5)$$

Symbols in these equations represent the followings: K(T) is the transformer efficiency (no unit), α(T) is the phase difference of the first cos phase voltage from the exciting voltage (rad), θ1 is the first rotational angle of the first rotor (rad), and R(T) is the impedance (Ω) of the common earth wire. Further, each symbol with suffix (T) means that the state of the parameter represented by the symbol varies in dependence on the temperature.

Next, the first sin phase coil 34 of the first resolver 15s is wound in a slot of the stator which is fixed around the first rotor 31 in coaxial alignment therewith, with a phase difference of 90-electrical angles form the aforementioned first cos phase coil 36. The first sin phase coil 34 is connected to the input port 52c of the CPU 52 so that the first sin phase voltage generated at one end thereof is input to the input port 52c of the CPU 52, and is further connected to the common earth wire 46 at the other end thereof. The first sin phase voltage (expressed by equation (7) referred to later) is the voltage which is made as a result that the alternating-current bias voltage (expressed by the aforementioned equation (4)) which depends on the impedance 48 of the common earth wire 46 and the exciting current is superimposed on an alternating-current rotational angle voltage (expressed by equation (6) referred to later) whose amplitude fluctuates in dependence on the sin value at the rotational angle θ1 of the first rotor 31.

The rotational angle voltage of the first sin phase voltage is expressed by the following equation (6).

$$V\sin 1 = EK(T)\sin(\omega t + \alpha(T))\sin(\theta 1) \quad (6)$$

The first sin phase voltage is expressed by the following equation (7) which is obtained by adding the equation (6) and the equation (4).

$$V\sin 1T = EK(T)\sin(\omega t + \alpha(T))\sin(\theta 1) + R(T)I\sin(\omega t + \beta(T)) \quad (7)$$

The symbols used in these equations are the same as those described in connection with the equations (1) to (5).

The second cos phase coil 44 and the second sin phase coil 43 of the second resolver 16s are also connected with the common earth wire 46. Since other basic configuration of the second resolver 16s is the same as that of the first resolver 15s, further description thereof will be omitted.

In this manner, the first exciting coil 31, the first cos phase coil 36 and the first sin phase coil 34 of the first resolver 15s and the second exciting coil 42, the second cos phase coil 44 and the second sin phase coil 43 of the second resolver 16s are connected with the common earth wire 46 to be grounded. Thus, the number of wirings can be reduced substantially compared with the manner wherein they may be connected to six separated earth wires.

Next, description will be made regarding a processing content for making a compensation for the influence of the temperature by the use of the torque detection device 30 in the present embodiment. Although in the present embodiment, the compensation processing is executed on a real time basis, it may of course be executed at a certain time interval or may be executed when there is given a trigger or the like for the processing starting of the temperature compensation.

Figure 3:
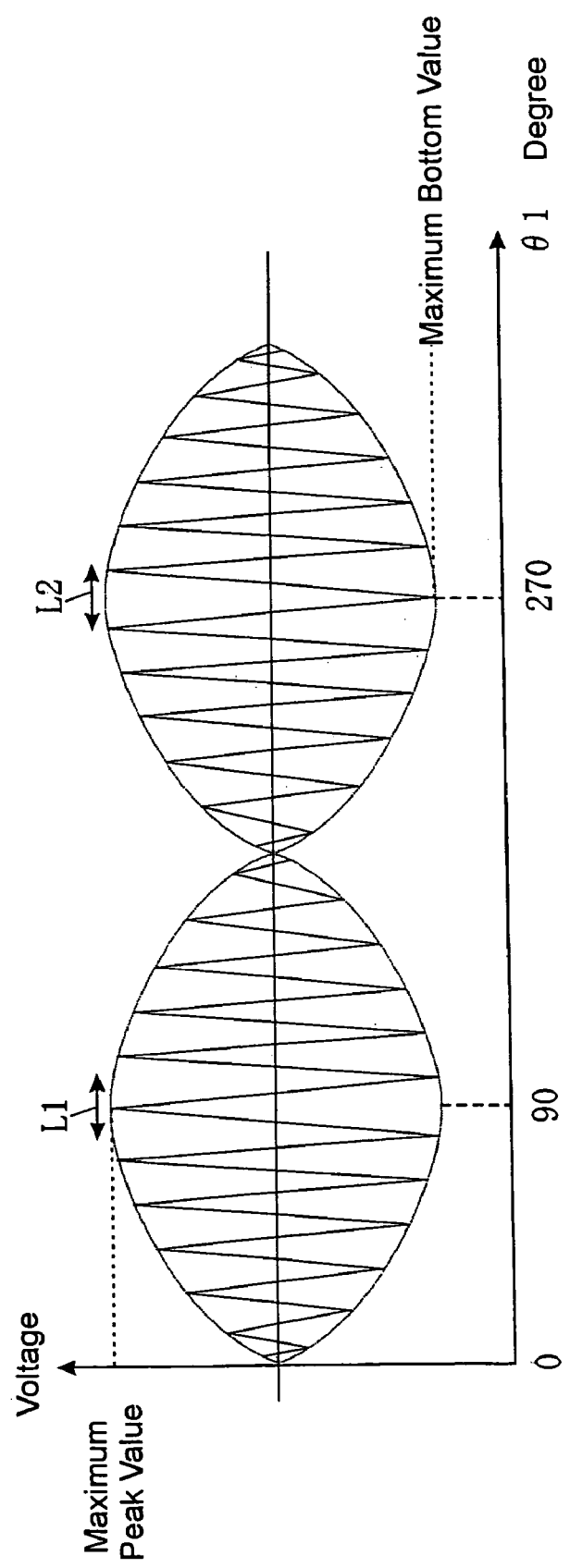
FIG. 3 is a graph showing an output voltage obtained when a rotor rotates 360-degrees in electrical angle.

First, it is now assumed that after beginning of applying the exciting voltage, the driver rotates the handle 11 illustrated in FIG. 1 thereby to rotate the electrical angle θ1 of the first rotor 31 from 0 to 360 degrees. While the rotating operation is performed, the CPU 52 samples the first sin phase voltages of the first resolver 15s at a sampling interval of 50 μs and stores the data in the RAM 58.

Where the sampled data of the first sin phase voltages are plotted with the horizontal axis and the vertical axis indicating the rotational angle θ1 and the voltage value respectively, there is drawn an alternating-current waveform the amplitude of which fluctuates in dependence on sin(θ1) as shown in FIG. 3. However, the waveform actually becomes a waveform whose wavelength is much shorter than that shown in FIG. 3. For example, assuming that the rotational frequency of the exciting voltage is 5 kHz, the cycle of the first sin phase voltage becomes 200 μs, and then assuming that it takes one second for the handle to be actually rotated through one revolution in electrical angle, the waveforms of 5,000 pulses are included in one cycle of the handle.

The CPU 52 performs a processing for detecting the voltage data including the maximum peak value, of the first sin voltage data. At the electrical angle where the output voltage which is made as a result that the bias voltage is superimposed on the rotational angle voltage shows the peak value, the rotational angle voltage also shows the peak value. At sin(θ1)=1, that is, the electrical angle θ1=90 degrees, the rotational angle voltage shows the peak value. In the present embodiment, a sampling is performed for the voltage data which are included within the range of 89.5 through 90.5 degrees (i.e., 1 degree) in electric angle θ1. In an imaginary sense, the data in the range L1 shown in FIG. 3 are sampled. Further, the CPU 52 performs a processing for detecting the voltage data including the maximum bottom value, of the first sin voltage data. At the electrical angle where the output voltage which is made as a result that the bias voltage is superimposed on the rotational angle voltage shows the bottom value, the rotational angle voltage also shows the bottom value. At sin(θ1)=−1, that is, the electrical angle θ1=270 degrees, the rotational angle voltage shows the bottom value. In the present embodiment, a sampling is performed for the voltage data which are included within the range of 269.5 through 270.5 degrees (i.e., 1 degree) of the electrical angle θ1. In an imaginary sense, the data in the range L2 shown in FIG. 3 are sampled.

Figures 4A, 4B:
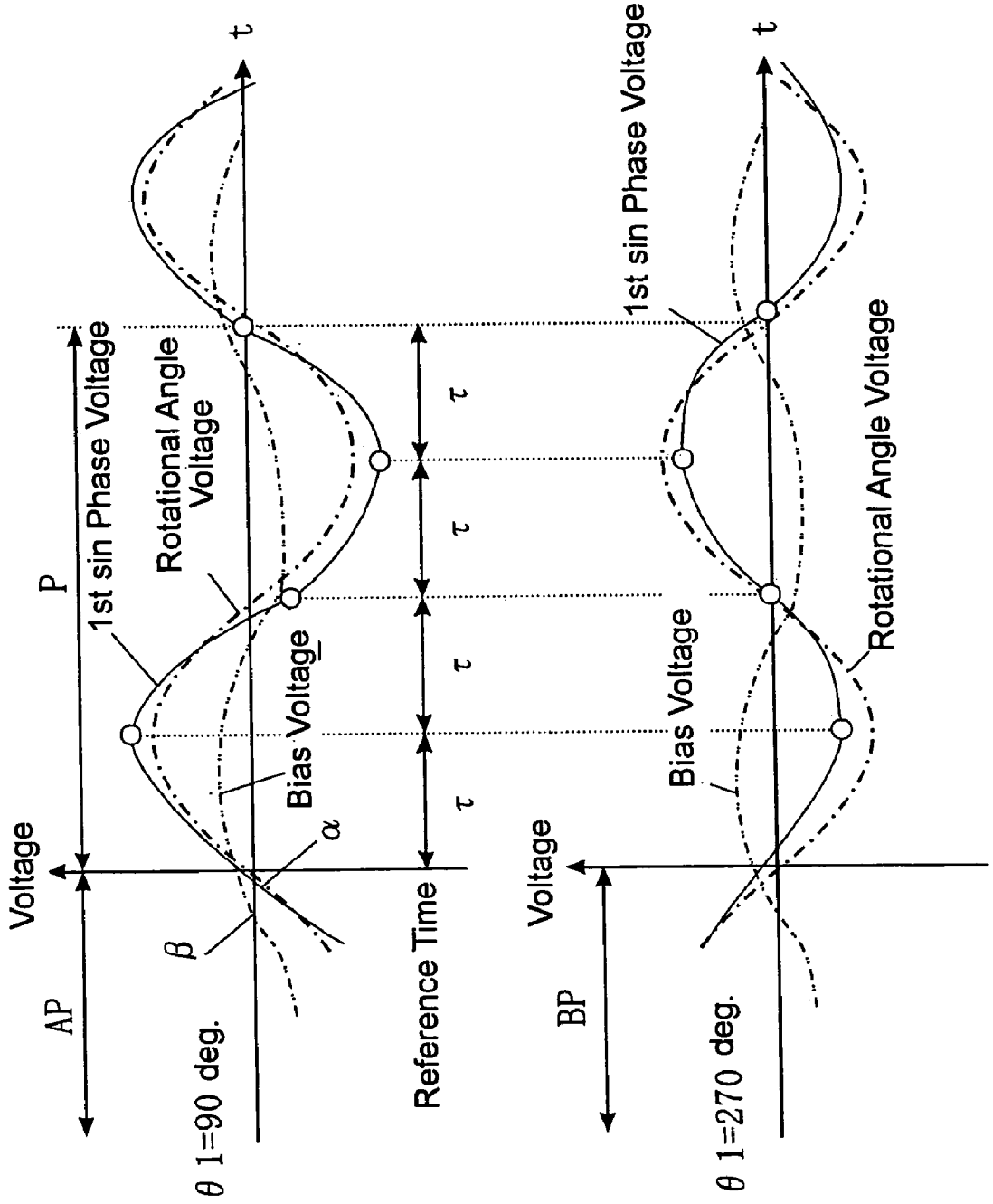
FIG. 4 is a diagram illustrating the maximum peak value, the maximum bottom value, and each voltage wave.
Figure 5:
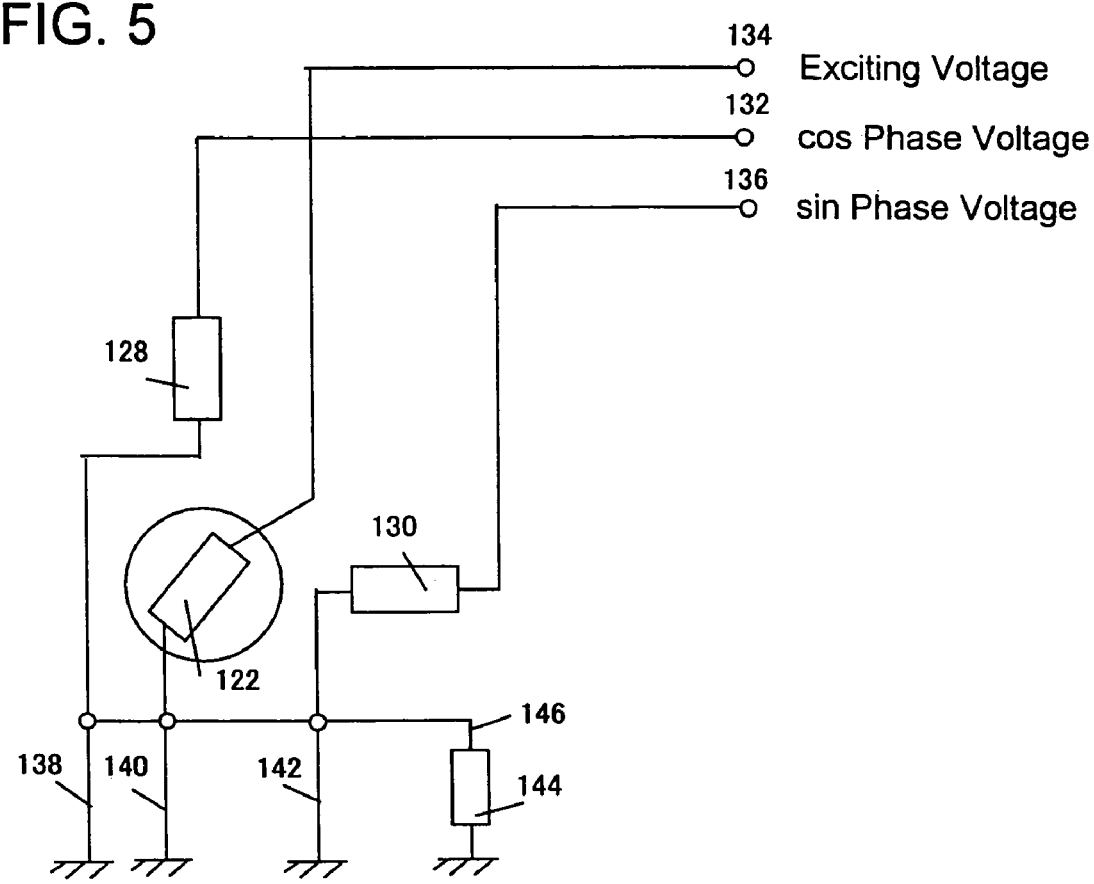
FIG. 5 is a block diagram illustrating a rotational angle detection device constituting a prior art.

FIGS. 4(a) and 4(b) are graphs each setting the horizontal axis and the vertical axis as time and voltage respectively. FIG. 4(a) shows those data around the maximum peak value of the first sin phase voltages, and the rotational angle voltages and the bias voltages which compose such those data. FIG. 4(b) shows those data around the maximum bottom value of the first sin phase voltages, and the rotational angle voltages and the bias voltages which compose such those data. FIGS. 4(a) and 4(b) are graphs in which the range L1 and the range L2 on the time axis shown in FIG. 3 are drawn in an enlarged scale. A symbol P in FIG. 4 designates the cycle of the first sin phase voltage, and the cycle is set to 200 μs in the present embodiment. Another symbol τ in FIG. 4 designates the interval for the first sin phase voltages to be sampled by the CPU 52, and the interval is set to 50 μs in the present embodiment.

In the foregoing manner, after sampling the first sin phase voltage data including the maximum peak value for several cycles and the first sin phase voltage data including the maximum bottom value for the several cycles, the mutual data which are the same in the passing time from a reference time are subtracted in order from each other. In the present embodiment, the reference time is taken as a time point reached when a period which is integer times as long as the cycle P expires from a time point for application of the exciting voltage. A rotational angle voltage including a temperature component is calculated by dividing each subtracted value by numeral 2.

Then, in the same manner as the above, after sampling the first sin phase voltage data including the maximum peak value for several cycles and the first sin phase voltage data including the maximum bottom value for the several cycles, the mutual data which are the same in the passing time from the reference time are added in order to each other. A bias voltage including the temperature component is calculated by dividing each added value by numeral 2.

Two time points to be multiplied with the rotational angle velocity which composes the rotational angular voltage calculated in the foregoing means are chosen, and rotational angular voltage values at such time points are taken out. This determines the values of two parameters each including the temperature component and composing the rotational angle voltage. Further, two time points to be multiplied with the rotational angle velocity which composes the bias voltage calculated in the foregoing means are chosen, and bias voltage values at such time points are taken out. This determines the values of two parameters each including the temperature component and composing the bias voltage. By using the four parameters each including the temperature component and calculated in the foregoing manner, the rotational angle which is taken out even at any time point represents accurate angle information which is not affected by the real time temperature variation.

The foregoing contents can be expressed by general equations as follows. The following equations represent a general equation (8) for the maximum peak values of the first sin phase voltage data and a general equation (9) for the maximum bottom values of the first sin phase voltage data.

$$V \sin 1\max = EK(T)\sin(\omega t+\alpha(T))\sin(90 \text{ degrees})+R(T)I \sin(\omega t+\beta(T)) \quad (8)$$

$$V \sin 1\min = EK(T)\sin(\omega t+\alpha(T))\sin(270 \text{ degrees})+R(T)I \sin(\omega t+\beta(T)) \quad (9)$$

By subtracting the equation (9) from the equation (8) and then by dividing the quotient by numeral 2, calculation is made for (V sin 1 max−V sin 1 min)/2=EK(T) sin(ωt+α(T)), that is, the rotational angle voltage including the temperature component. Then, by measuring at least 2 points which are different in time t, K(T) and α(T) are calculated. Likewise, by adding the equation (8) and the equation (9) and by dividing the sum by numeral 2, calculation is made for (V sin 1max+V sin 1min)/2=R(T) I sin(ωt+β(T)), that is, the bias voltage including the temperature component. Then, by measuring at least 2 points which are different in time t, R(T) and β(T) are calculated.

Regarding the aforementioned equation (7), V sin 1T is the value which is taken into the CPU 52 via an input port as the first sin phase voltage. Furthermore, the values E, ω, and I are those memorized in EEPROM 62, and the temperature-dependant components K(T), α(T), R(T) and β(T) have also been calculated through the foregoing calculations. By using these values, the equation (7) can be transformed as follows:

$$\sin(\theta 1) = \{V \sin 1T - R(T)I \sin(\omega t+\beta(T))\}/EK(T)\sin(\omega t+\alpha(T))$$

As a result, θ1 which is not affected by the change in temperature can be calculated.

Although the concrete embodiment of the present invention has been described above in detail, it is only for the illustration purpose and does not limit the scopes of the patent claims. The technologies described in the patent claims encompass those which are transformed and modified variously from the concrete embodiments illustrated above.

(1) In the foregoing embodiment, the description has been made taking the example wherein the present invention is applied to the torque detection device having two rotational angle detection devices. However, the present invention may also be applied to a rotational angle detection device which is not a torque detection device.

(2) Although the resolver has been shown to be of the construction having one exciting coil at the rotor side and two output coils at the stator side, the present invention may of course be applicable to a resolver of the construction having two exciting coils at the stator side and one or two output coils at the rotor side.

INDUSTRIAL APPLICABILITY

The rotational angle detection device and the temperature compensation method thereof according to the present invention are suitable for use in an automotive electric power steering apparatus which converts the rotation of a steering wheel by the driver to the axial motion of a rack shaft through a rack and pinion mechanism and which assists the axial motion of the rack shaft with a steering force amplified by an electric motor so that the orientation of wheels is controlled via tie rods and knuckle arms.

The invention claimed is:

1. A rotational angle detection device having: a rotating rotor; an exciting coil secured to the rotor and having one end thereof to which an alternating-current exciting current is applied and the other end thereof connected to an earth wire; and a stator coil stationarily provided around the rotor and having one end thereof for taking out an output voltage and the other end thereof connected to the earth wire, the stator coil being for outputting the voltage which is made as a result that an alternating-current bias voltage, caused by an impedance of the earth wire and the exciting current, is superimposed on an alternating-current rotational angle voltage the amplitude of which fluctuates in dependence on the rotational angle of the rotor; the improvement of the rotational angle detection device further comprising: memory means for storing data necessary to calculate values of temperature-dependent components in connection with the passing time from a reference time; rotational angle voltage detection means for calculating the alternating-current rotational angle voltage by subtraction means for subtracting the data stored in the memory means; bias detection means for calculating the alternating-current bias voltage by addition means for adding the data stored in the memory means; and means for calculating an amplitude value of the alternating-current rotational angle voltage, a phase difference of the alternating-current rotational angle voltage from the reference time, an amplitude value of the alternating-current bias voltage, and a phase difference of the alternating-current bias voltage from the reference time, based on values sampled by the rotational angle voltage detection means and the bias detection means at at least two different time points.

2. The rotational angle detection device according to claim 1, characterized by further comprising: means for successively sampling and storing the output voltages during the rotation of the rotor; means for specifying first output voltages for at least one cycle including the maximum peak value, from the output voltages being stored; means for specifying second output voltages for at least one cycle including the maximum bottom value, from the output voltages being stored; and means for successively subtracting and adding voltages which are the same in the passing time from the reference time, of the specified first output voltages and the specified second output voltages.

3. A temperature compensation method for the temperature which affects an output voltage of a rotational angle detection device for outputting the voltage which is made as a result that an alternating-current bias voltage caused by an impedance of an earth wire and an exciting current is superimposed on an alternating-current rotational angle voltage whose amplitude fluctuates in dependence on the rotational angle of a rotor, the temperature compensation method comprising: a first step of successively sampling the output voltages, with the rotor being rotated; a second step of specifying first output voltages for at least one cycle in rotational angle including the maximum peak value, from the sampled output voltages, a third step of specifying second output voltages for at least one cycle in rotational angle including the maximum bottom value, from the sampled output voltages; a fourth step of calculating the alternating-current rotational angle voltage by successively subtracting first and second output voltages which are the same in the passing time from a reference time, of the specified first output voltages and the specified second output voltages; a fifth step of calculating the alternating-current bias voltage by successively adding first and second output voltages which are the same in the passing time from the reference time, of the specified first output voltages and the specified second output voltages; and a sixth step of calculating an amplitude value of the alternating-current rotational angle voltage, a phase difference of the alternating-current rotational angle voltage from the reference time, an amplitude value of the alternating-current bias voltage, and a phase difference of the alternating-current bias voltage from the reference time, based on values which have been sampled at at least two different time points at the fourth step and the fifth step.

* * * * *